United States Patent Office 3,384,477
Patented May 21, 1968

3,384,477
ALUMINUM ALLOYS
Romeo A. Zuech, Woodland Hills, Calif., assignor to North American Rockwell Corporation, a corporation of Delaware
No Drawing. Filed Feb. 24, 1966, Ser. No. 529,654
3 Claims. (Cl. 75—142)

This invention relates to a new alloy. More particularly, the invention relates to a new aluminum base alloy which has a melting point sufficiently high so that the alloy can be used for brazing applications.

The invention described herein was made in the performance of work under a NASA contract and is subject to the provisions of the National Aeronautics and Space Act of 1958, Public Law 85–568 (72 Stat. 426; 42 USC 2451), as amended.

Though aluminum has found wide spread use in both the airplane and aerospace industry, it has not been used where welding and brazing is required in the same assembly. The reason for this lack of utilization where brazing is required is that no aluminum welding rod having a melting point sufficiently high to withstand the high temperatures used in the brazing cycle of from 1,080° to 1,120° F. have been developed.

It is an object of this invention to provide an aluminum alloy which can be used to form a welding rod having a melting point sufficiently high to permit brazing after welding.

Another object of this invention is to provide an aluminum base alloy having good mechanical properties.

A further object of the invention is to provide a new aluminum alloy which can be used for high strength sand castings of aluminum assemblies such as ducts, bellows, and complex valves, that requires brazing or brazing after welding.

Still another object of the invention is to provide an aluminum alloy that can be used in the form of bar, plate, sheet extrusions in die forging.

One further object of the invention is to provide an aluminum alloy having high strength at elevated temperature.

The above and other objects of the invention are accomplished by a new alloy which is comprised of 4.0–5.0 weight percent nickel, .5–1.5 weight percent magnesium, 0.4–1.4 weight percent silicon, .03–.50 weight percent beryllium, .03–.30 weight percent titanium, .03–1.0 weight percent copper, .03–.30 weight percent chromium with the remainder being aluminum. Additionally, there may be present in small amounts, iron, manganese, and zinc. Thus up to .30 weight percent iron may be present, .10 weight percent manganese, and up to .10 weight percent zinc. When such trace small amounts of these three elements are present they accordingly reduce the amount of aluminum that will make the remainder of the alloy. The following Table I gives a most preferred composition and a preferred range of composition for the elements comprising the alloy of the invention.

TABLE I.—CHEMICAL COMPOSITION OF THE NEW ALLOY

| Element | Most Preferred Composition (Wt. Percent) | Preferred Composition Limits (Wt. Percent) |
| --- | --- | --- |
| Ni | 4.50 | 4.25–4.75 |
| Mg | 1.10 | 1.0–1.20 |
| Si | 0.65 | 0.6–0.80 |
| Be | 0.05 | 0.30–0.06 |
| Ti | 0.15 | 0.10–0.20 |
| Cu | 0.20 | 0.10–0.30 |
| Cr | 0.20 | 0.10–0.30 |
| Fe | 0.15 | [1] 0.30 |
| Mn | ([2]) | [1] 0.10 |
| Zn | ([2]) | [1] 0.10 |
| Al | ([3]) | ([3]) |

[1] Maximum.
[2] Nil.
[3] Remainder

It is believed the invention will be more appreciated from the following detailed examples:

Example I

A 300 gram heat was made of the alloy of the invention starting from existing aluminum. To the aluminum was added aluminum master alloys such as Al-Ti and Al-Be. The nickel and magnesium were dissolved in the molten alloy in the form of pure metals. The 300 gram crucible used was made of alumina plus silica. The furnace for the melt was a standard electric out furnace. The chemical composition had a weight percent of elements as indicated by the most preferred composition of Table I. Cast one inch diameter billets of approximately 100 grams each were produced in an aluminum mold.

Example II

Welding rods of the alloy made in Example I were made utilizing a small extrusion die designed to produce approximately eight feet of .125″ rod. The welding rod was extruded through the die by using a standard tensile machine as a press. The extrusion temperature was 1050° F. and the pressure was approximately 50,000 lbs.

Example III

The welding rod made in Example II was used with tungsten-inert gas and was used in welding parent material made of 6061 aluminum plates of sizes varying from .250–.500″ thick. The various welded test plates were radiographically and penetrant inspected. A post weld heat treatment was applied which consisted of solution heating for six to ten hours at 1,020° F.–1,040° F. with water or oil quench plus six to eight hours age at 340° F. to 350° F. The welded test plate was then passed through a brazing cycle by heating to 1,000° F. for one-half hour and then transferring to a brazing furnace in which the temperature was 1,100° F. to 1,120° F. The plate was at the brazing temperature for one minute. Post brazing metallographic examination of the weld revealed no eutectic melting indicating that the weld was not affected by the brazing cycle. Standard tests such as welding test plates and welding circular restrain plates revealed that the welding rod of the invention is readily weldable and no major problems are encountered in its usage.

The results of several 6061–T6 test bars tested, with weld reinforcement machined off, indicated mechanical properties on the order of 48 K s.i. ultimate strength, 44 K s.i. yield strength and eight percent elongation.

These results were obtained in test bars that broke in the 6061 parent material indicating that the actual strength of the new alloy is superior to that of the 6061.

From the manner in which the alloy of the invention was extruded to a .125″ rod from a one inch slug, it is shown that the alloy is very compatible with hot forming such as extrusion and hand or die forging.

Although the invention has been described and illustrated in detail, it is to be clearly understood that the same is by way of illustration and example only and is not to be taken by way of limitation, the spirit and scope of this invention being limited only by the terms of the appended claims:

I claim:

1. An aluminum alloy comprising:

| | Weight percent |
|---|---|
| Ni | 4.0 to 5.0 |
| Mg | .5 to 1.5 |
| Si | .4 to 1.4 |
| Be | .03 to .50 |
| Ti | .03 to .30 |
| Cu | .03 to 1.0 |
| Cr | .03 to .30 |
| Fe, up to | .30 |
| Mn, up to | .10 |
| Zn, up to | .10 | with the remainder being Al.

2. The alloy of claim 1 wherein there is present:

| | Weight percent |
|---|---|
| Ni | 4.25 to 4.75 |
| Mg | 1.0 to 1.20 |
| Si | .6 to .8 |
| Be | .03 to .06 |
| Ti | .10 to .20 |
| Cu | .10 to .30 |
| Cr | .10 to .30 |
| Fe, up to | .30 |
| Mn, up to | .10 |
| Zn, up to | .10 | with the remainder being Al.

3. The alloy of claim 2 wherein there is present:

| | Weight percent |
|---|---|
| Ni | 4.50 |
| Mg | 1.10 |
| Si | .65 |
| Be | .05 |
| Ti | .15 |
| Cu | .20 |
| Cr | .20 |
| Fe | .15 |
| Mn, up to | .10 |
| Zn, up to | .10 | with the remainder being Al.

References Cited

UNITED STATES PATENTS

| | | | |
|---|---|---|---|
| 2,336,512 | 12/1943 | Stroup | 75—142 |
| 2,383,026 | 8/1945 | Toleik | 75—142 |
| 2,522,575 | 9/1950 | Hall et al. | 75—142 |
| 3,306,787 | 2/1967 | Dies | 148—32 |

HYLAND BIZOT, *Primary Examiner.*

RICHARD O. DEAN, *Examiner.*